Jan. 22, 1929.
E. G. APPLETON
1,699,601
SWITCH
Filed June 11, 1927
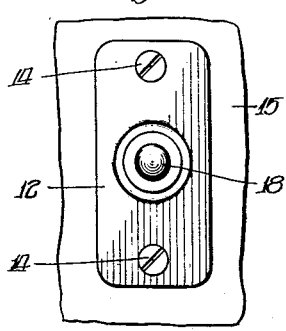
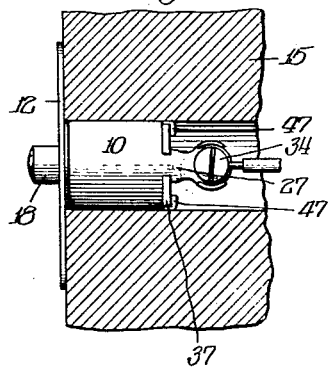
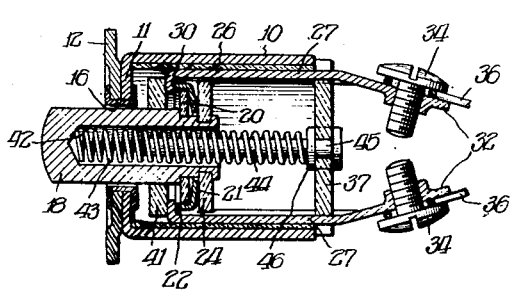
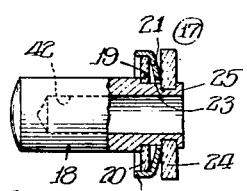
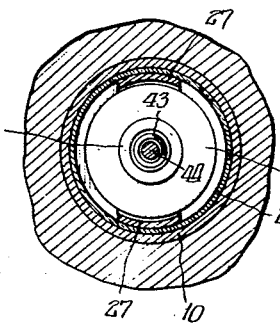
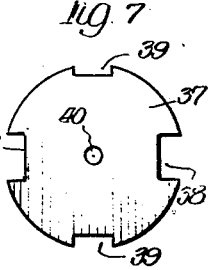
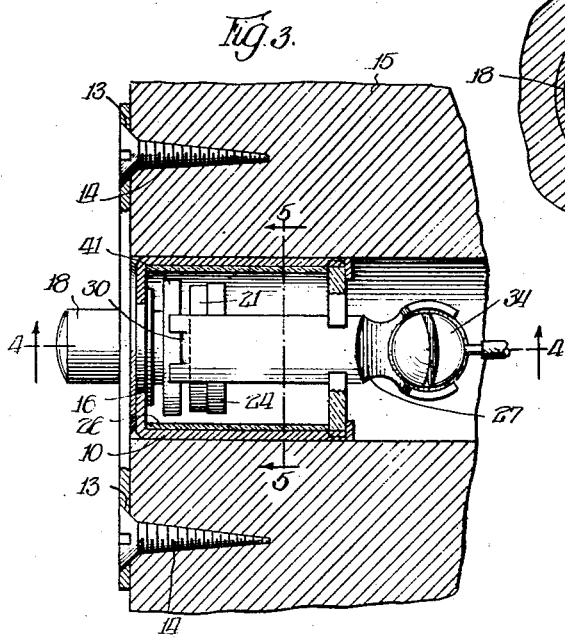
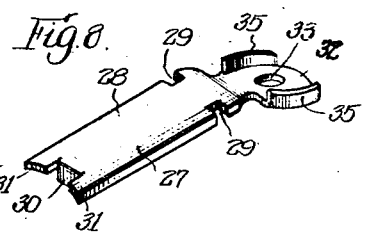
Inventor:
Ernst G Appleton,
By Wilkinson, Huxley, Byron & Knight
Attys
Witness:
R. Burkhardt Patented Jan. 22, 1929.

1,699,601

UNITED STATES PATENT OFFICE.

ERNST G. APPLETON, OF CHICAGO, ILLINOIS, ASSIGNOR TO ROACH-APPLETON MANUFACTURING COMPANY, OF CHICAGO, ILLINOIS, A CORPORATION OF ILLINOIS.

SWITCH.

Application filed June 11, 1927. Serial No. 198,038.

The present invention relates to switches. More particularly the present invention relates to electric switches of relatively small size and has particular reference to switches suitable for mounting upon the frame of an automobile to be operated when the door of said automobile is opened.

An object of the present invention is to provide an electric switch involving simple parts, which may be made at relatively small expense and which is well adapted to meet the needs of commercial service.

A further object is to provide an electric switch, parts of which are so interrelated that they are well adapted for manufacture on a quantity basis.

A further object is to provide an electric switch which may be mounted in position within the frame or other convenient part of an automobile or the like with a minimum of trouble.

Further objects will appear as the description proceeds.

Referring to the drawings—

Figure 1 is a view in elevation of part of the door frame of an automobile showing an embodiment of the present invention applied thereto;

Figure 2 is a sectional view showing the door frame broken away to illustrate an embodiment of the present invention in side elevation;

Figure 3 is a view on an enlarged scale similar to Figure 2 but showing the casing and insulating lining broken away to show the interior of the switch;

Figure 4 is a sectional view taken along the plane indicated by the arrows 4—4 of Figure 3;

Figure 5 is a sectional view taken along the plane indicated by the arrows 5—5 of Figure 3; and Figures 6, 7 and 8 illustrate details of construction.

The numeral 10 indicates a cylindrical shell having an end portion thereof flanged over as indicated by the numeral 11. The numeral 12 indicates a face plate provided with the holes 13—13 for the reception of holding screws 14—14 which may be screwed into the material of a door frame indicated by the numeral 15. Said face plate and cylindrical member 10 may be riveted together by means of the rivet 16, which rivet provides an aperture for the reception of the plunger of the switching mechanism hereinafter to be described.

Figure 6 indicates a plunger unit which is indicated as a whole by the numeral 17. Said unit 17 includes a plunger 18 adapted to slide within the rivet 16 above referred to. Said plunger has its inner extremity reduced in diameter to provide a shoulder 19, which shoulder is adapted to receive the insulating washer 20, which washer closely fits the reduced portion of said plunger 18. Disposed next to the insulating washer 20 is the cup-shaped member 21 of conducting material, which cup-shaped member is provided with the annular wall 22 for receiving the periphery of the washer 20. The cup-shaped member 21 is provided with the central aperture 23 of a size materially greater than the corresponding portion of the plunger 18, the result being that by reason of the engagement of the wall 22 of the cup-shaped member 21 with the outer periphery of the washer 20, the conducting member 21 is held out of contact with the plunger 18. As shown in the drawings, the bottom wall 23$^A$ of the cup-shaped member 21 is belled, for a purpose to be referred to hereinafter. Spaced from the shoulder 19 a distance slightly greater than the distance between the left-hand plane of the washer 20 and the right-hand extremity of the belled bottom wall 23$^A$ of the cup-shaped member 21 (as the parts are viewed in Figures 4 and 6) is the shoulder 23$^B$, which forms an abutment for the insulating washer 24. The washer 24 may be held against axial movement relative to the plunger 18 by means of the swedged over end portion 25 of the plunger 18, which rivets said washer 24 upon the plunger 18. The cup-shaped member 21 floats or rocks upon the plunger 18.

Disposed within the cylindrical member 10 is a cylindrical lining 26 of insulating material. Positioned within the lining 26 is a pair of contact members 27—27, which may be identical in shape. One of said members 27 is illustrated in perspective in Figure 8. From an inspection of said figure it will be noted that each member 27 includes an elongated portion 28 which may be of arcuate cross section to conform substantially to the cylindrical formation of the lining 26. At one extremity of the elongated portion 28 are the notches 29—29 in the opposite sides of said elongated portion 28. The other end of the elongated portion of each member 27 is provided with the inwardly struck tongue 30, which serves to bifurcate the corresponding extremity of the elongated portion 28 forming the two fingers 31—31. Said tongues 30 are adapted to be bridged by the cup-shaped member 21. That portion of each contact member 27 at the extremity adjacent to the notches 29 is provided with the binding post portion 32, which will preferably be bent out of line with the elongated portion 28. The binding post portions 32—32 of the two contact members 27—27 are bent toward the axis of the cylindrical member 10 for a purpose which will be apparent. Each of said binding post portions 32 is provided with the screw-threaded aperture 33 for the reception of a binding post 34. Each of said binding post portions 32 may also be provided with the pair of walls 35 for convenience in attaching an electrical conductor 36.

The numeral 37 indicates a disc of insulating material having the pair of diametrically opposed peripheral notches 38—38 and the second pair of diametrically opposed notches 39—39. Said disc is also provided with the central aperture 40. The notches 38—38 of the disc 37 are adapted to receive the contact members 27—27, the portion adjacent to the notches 29—29 of each contact member 27 being located in one of said notches 38 of the disc 37. The fingers 31—31 at the extremity of each contact member 27 are adapted to engage a washer 41 of insulating material slidably mounted upon the plunger 18. By reason of their engagement with the disc 37 and the washer 41 and by reason of the fact that they are confined within the lining 26 of the cylindrical member 10, the contact members 27—27 are held in rigid relationship relative to said cylindrical member 10.

The plunger 18 is provided with the axial aperture 42 adapted to receive the coil spring 43. Said coil spring 43 has mounted within one extremity thereof the pin 44 having the end portion 45 adapted to be seated within the aperture 40 of the disc 37. Said pin 44 is also provided with the shoulder 46 adjacent to the end portion 45 for abutting against the inner surface of the disc 37 and for receiving the thrust of the spring 43 when said spring is compressed by reason of inward movement of plunger 18.

The cylindrical member 10 is provided at its extremity distant from the flange 11 with lugs 47—47 adapted to be seated within the notches 39—39 of the disc 37. Said lugs 47 may be turned over to hold the disc 37 in rigid relationship with said cylindrical member 10.

It will be clear without detailed explanation that the spring 43 which is guided by the pin 44 will bias the cup-shaped member 21 of the plunger unit 17 into bridging relationship with the tongues 30—30 of the contact members 27—27, the floating or rocking action of said member 21 on the plunger 18 producing the advantage that said member 21 will accommodate itself to perform its bridging action regardless of inaccuracies in the positioning of the tongues 30—30. When the plunger 18 is pressed inwardly against the tension of the spring 43, the bridging relationship across said contact members 27 will be interrupted. By reason of this construction the device is very well adapted for a door switch of an automobile. The plunger 18 will be positioned to be held inwardly when the door is closed, whereby the circuit is interrupted across the contact members 27—27. When the automobile door is opened, however, the spring 43 will urge the plunger 18 outwardly, moving the cup-shaped member 21 of conducting material into bridging relationship with the tongues 30—30 of the contact members 27—27, whereby a lamp connected in circuit with said contact members 27—27 will be lighted.

The construction illustrated and described is cheap to assemble and lends itself to quantity production. The switch is simple to install and is very well adapted to meet the needs of commercial service.

Though a preferred embodiment has been described in detail, many modifications will occur to those skilled in the art. It is intended to cover all such modifications that fall within the scope of the appended claims.

What is claimed is—

1. In an electric switch, in combination, a housing member, a pair of contact members disposed therein which contact members are provided with contact portions, a pair of insulating members spaced apart and positioned between said contact members to hold said contact members apart, a plunger, and a contact member positioned upon said plunger but insulated therefrom, said plunger being positioned between said first mentioned contact members and being biased to urge said second mentioned contact member into bridging relationship with said contact portions of said first mentioned contact members.

2. In an electric switch, in combination, a housing, a disc secured to said housing at one extremity thereof, a plunger extending through the opposite extremity of said housing, spring means cooperating with said disc and said plunger to urge said plunger outwardly of said housing, a pair of elongated contact members engaged by said disc, said disc holding said contact members apart, and a second disc spaced from said first disc for holding said contact members apart, said contact members being provided with contact portions, said plunger being provided with a bridging member, said bridging member comprising a washer rockingly mounted on said plunger but insulated therefrom and being disposed in position to yieldably bridge the said contact portions of said contact members under the influence of said spring means.

3. In an electric switch, in combination, a housing, a disc secured to said housing at one extremity thereof, a plunger extending through the opposite extremity of said housing, spring means cooperating with said disc in said plunger to urge said plunger outwardly of said housing, a pair of elongated contact members engaged by said disc, said disc holding said contact members apart, and a second disc spaced from said first disc for holding said contact members apart, said contact members being provided with contact portions, said plunger being provided with a bridging member, said bridging member being disposed in position to yieldably bridge the said contact portions of said contact members under the influence of said spring means, said plunger being provided with a washer fitting said plunger, said bridging member being provided with portions engaging the periphery of said washer and being provided with a central aperture spacing said bridging member from said plunger.

4. In an electric switch in combination, a cylindrical housing, a sleeve of insulating material lining the interior of said housing, a disc of insulating material closing one extremity of said housing, a plunger unit slidably disposed in the other extremity of said housing, said plunger unit including a bridging member, a pair of contact members disposed adjacent to the inner periphery of said cylindrical member, said contact members being interlocked with said disc, and a second disc spaced from said first mentioned disc cooperating with said first mentioned disc and said cylindrical housing for holding said contact members in relatively fixed spaced relationship with one another against said sleeve of insulating material.

5. In an electric switch in combination, a cylindrical housing, a sleeve of insulating material lining the interior of said housing, a disc of insulating material closing one extremity of said housing, a plunger unit slidably disposed in the other extremity of said housing, said plunger unit including a bridging member, a pair of elongated contact members disposed within said sleeve, said contact members being interlocked with said disc, and a second disc spaced from said first mentioned disc cooperating with said first mentioned disc and said cylindrical housing for holding said contact members in relatively fixed spaced relationship with one another in engagement with said sleeve, and spring means between said disc and said plunger unit for normally holding said bridging disc in bridging relationship with portions of said contact members.

6. In an electric switch in combination, a cylindrical housing, a disc of insulating material closing one extremity of said housing, a plunger unit slidably disposed in the other extremity of said housing, said plunger unit including a bridging member, a pair of contact members disposed adjacent to the inner periphery of said cylindrical member, said contact members being interlocked with said disc, and a second disc spaced from said first mentioned disc cooperating with said first mentioned disc and said cylindrical housing for holding said contact members in relatively fixed spaced relationship with one another, said plunger unit including a spacing disc of insulating material fixed relative to said plunger unit, said bridging member having portions engaging the periphery of said disc to hold said bridging member out of contacting relationship with said plunger.

7. In an electric switch in combination, a cylindrical housing, a disc of insulating material closing one extremity of said housing, a plunger unit slidably disposed in the other extremity of said housing, said plunger unit including a bridging member, a pair of contact members disposed adjacent to the inner periphery of said cylindrical member, said contact members being interlocked with said disc, a second disc spaced from said first mentioned disc cooperating with said first mentioned disc and said cylindrical housing for holding said contact members in relatively fixed spaced relationship with one another, and spring means between said disc and said plunger unit for normally holding said bridging disc in bridging relationship with portions of said contact members, said plunger unit including a spacing disc of insulating material fixed relative to said plunger unit, said bridging member having portions engaging the periphery of said disc to hold said bridging member out of contacting relationship with said plunger.

8. In an electric switch, contact members, a bridging member therefor, and a plunger, said plunger being provided with an insulating washer fitting said plunger, said bridging member being provided with portions engaging the periphery of said washer and being provided with a central aperture spacing said bridging member from said plunger.

9. In an electric switch, in combination, a housing, a disc secured to said housing at one extremity thereof, a plunger extending through the opposite extremity of said housing, spring means cooperating with said disc and said plunger to urge said plunger outwardly of said housing, a pair of elongated contact members engaging said disc for holding said contact members apart, and a second disc spaced from said first disc for holding said contact members apart, said contact members being provided with contact portions, said plunger being provided with a bridging member, said bridging member having a rocking action on said plunger, said bridging member being disposed in position to yieldably bridge the said contact portions of said contact members under the influence of said spring means.

10. In an electric switch, in combination, contact members, a bridging member therefor, a plunger carrying said bridging member, said plunger being provided with an insulating washer, said bridging member being provided with portions engaging the periphery of said washer and being provided with a central aperture spacing said bridging member from said plunger, and insulating means for limiting movement of said bridging member longitudinally of said plunger while permitting rocking movement of said bridging member relative to said plunger.

11. In an electric switch, in combination, contact members, a bridging member therefor, and a plunger for carrying said bridging member, said plunger being provided with an insulating member for limiting movement of said bridging member in one direction, said bridging member being provided with insulating means for mounting same upon said plunger out of electrical contact with said plunger, said bridging member having a rounded portion adapted to have a rolling movement upon said insulating member.

Signed at Chicago, Illinois, this 2nd day of June, 1927.

ERNST G. APPLETON.